June 7, 1932.   N. LEGGE   1,862,188

POWER TRANSMISSION MECHANISM

Filed April 30, 1931

Norton Legge,
INVENTOR

BY Toulmin & Toulmin
ATTORNEYS.

Patented June 7, 1932

1,862,188

UNITED STATES PATENT OFFICE

NORTON LEGGE, OF HEXHAM, ENGLAND

POWER TRANSMISSION MECHANISM

Application filed April 30, 1931, Serial No. 533,998, and in Great Britain May 6, 1930.

This invention relates to overrunning and synchronizing devices for use in connection with the transmission of power, with especial reference to power transmission in road and rail vehicles.

The object of the present invention is to provide automatic and positive means for coupling and uncoupling jaw clutches for transmitting the driving torque according to whether the power unit is driving or is being overrun by the driven mechanism.

My device comprises a rotary driving member, a movable intermediate member whose function it is to transmit the drive from the driving to the driven member, and an automatic controlling member for causing said intermediate member to automatically take up the drive when the relative speeds of the driven and driving members synchronize. A control is not necessarily required for the operation of the device, but an external control is conveniently incorporated to provide a solid drive, when desired. A subsidiary uni-directional drive is employed for coupling the driving member and the controlling member, and is arranged so as to ensure that the teeth on the driving and intermediate members take up definite rotational positions when the driving and driven members synchronize, to allow ready mutual engagement without clashing of the jaws. The coupling between the controlling and intermediate members allows of a very slight relative rotation between these members to take up working clearances between the teeth of the intermediate and driving members.

Figure 1:
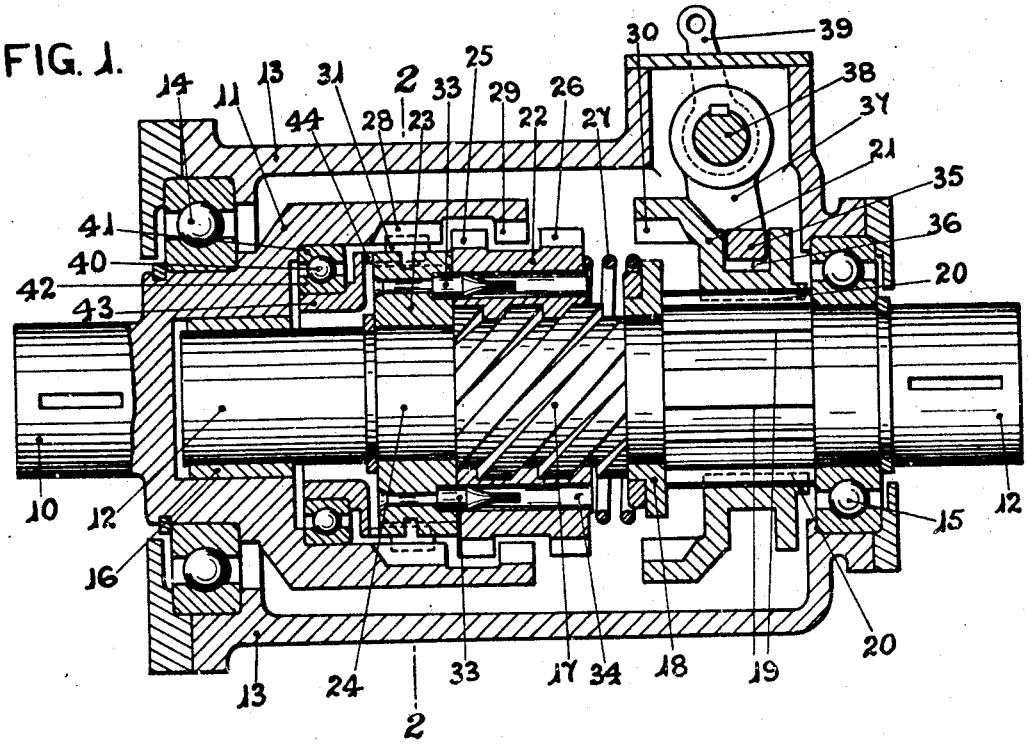
Figure 2:
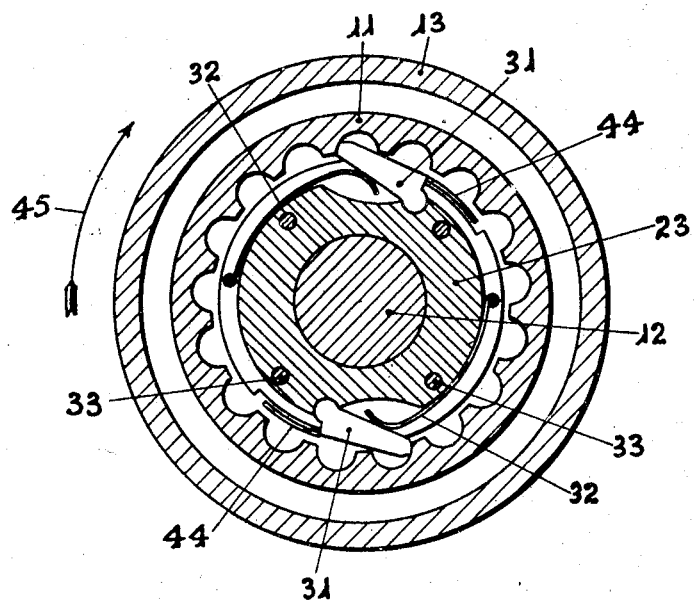

The accompanying drawing illustrates one example of overrunning and synchronizing mechanism in accordance with my invention, Figure 1 being a sectional elevation and Figure 2 a transverse section on the line 2—2 in Fig. 1, the mechanism being shown in the disengaged position.

Referring to the said drawing, in the construction therein illustrated, 10 is the driving shaft which is provided with a hollow enlargement 11, and 12 is the driven shaft which extends into said enlargement, the axes of said shafts being in alignment. 13 is a stationary casing enclosing the device. The shafts 10 and 12 run in ball bearings 14 and 15 mounted within said casing, and the end of the shaft 12 nearer the shaft 10 runs in a bush 16 within the enlargement 11. The shaft 12 has a quick-pitched helical thread 17 of suitable direction separated by a collar 18 from a ring of axial keyways 19 in the shaft 12, said keyways receiving the internal teeth 20 of a sliding dog clutch element 21 surrounding the said shaft and provided for the purpose of obtaining a solid drive.

Mounted on the thread 17 is an internally-threaded intermediate member 22 which can travel axially between the collar 18 and a controlling member 23 mounted around a plain portion 24 of the shaft 12. The intermediate member 22 has two rings of radial teeth 25 and 26. A spring 27 is interposed between the member 22 and the collar 18 so that, during overrunning periods, said member is kept away from said collar. The collar 18 takes the driving thrust.

The hollow enlargement 11 of the driving shaft is provided with rings of internal teeth 28 and 29, the teeth 29 co-operating with the teeth 25 on the member 22, and the dog clutch element 21 is provided with a ring of teeth 30 co-operating with the teeth 26 on the member 22.

The controlling member 23 carries a plurality of pawls 31 pressed outwardly by springs 32 into engagement with the teeth 28, and said controlling member 23 and the intermediate member 22 are coupled together by pins 33 mounted in the member 23 and projecting into axial holes 34 in the member 22. The positions of the pins 33 and holes 34 may be interchanged. The member 23 is partly rotatable on the shaft 12, but normally it rotates with said shaft. It will be noticed that the member 23 can freely overrun the teeth 28 in the direction indicated by the arrow 45 in Fig. 2, the pawls 31 riding over the teeth, but the member 23 cannot be overrun by the teeth 28 in the said direction which is the normal forward direction of rotation. The pawls 31 thus provide a subsidiary uni-directional drive between the driving shaft 10 and the controlling member 23. To permit the necessary small working backlash between the teeth 25 and 29, the pins 33 have tapered points, and when the teeth 25 and 29 are in engagement, the intermediate member 22 is in its right hand position and consequently the holes 34 are in engagement with the tapered portions of the pins. Hence it will be clear that a very small relative rotation is then possible between the members 22 and 23 and the teeth 25, 29 are then enabled to take up working clearances and make metal-to-metal engagement with one another, thus ensuring that the main drive to the shaft 12 is transmitted through these teeth and not through the pawls 31 and teeth 28. Except for the slight relative rotation above mentioned, the intermediate member 22 cannot rotate relatively to the controlling member 23, but it is free to move axially.

The subsidiary uni-directional drive ensures that the intermediate member 22 and the controlling member 23 are always located in definite rotational positions in relation to the teeth 29 when the speeds of the shafts 10 and 12 synchronize and the pawl 31 has engaged one of the teeth 28, and ready mutual engagement of the teeth 25, 29 is thus obtained. For this purpose, the number of teeth 28 is made equal to the number of the teeth 29.

The action of the device is as follows:—

On the shaft 10 commencing to revolve in the direction indicated by the arrow 45, the shaft 12 being stationary, the movement is transmitted by the teeth 28 and pawls 31 to the controlling member 23 and through the pins 33 to the intermediate member 22 which at once runs up the thread 17 against the collar 18 and its teeth 25 engage the driving teeth 29, whereupon the slight slip due to the tapered portions of the pins 33 being now in the holes 34 provides clearance between the pawls 31 and the teeth 28, and the teeth 29 and 25 take up the drive.

When the shaft 12 commences to overrun the driving shaft 10, the intermediate member 22 (which, by reason of the engagement of the teeth 25, 29 is revolving at the same speed as the shaft 10) is forced to travel to the left along the thread 17 which for the moment overruns the member 22. This travel of the member 22 disengages the teeth 25, 29 and uncouples the shaft 10 from the shaft 12. The spring 27 maintains the member 22 in its left hand position with the teeth 25, 29 disengaged while the shaft 12 overruns the shaft 10, and the pawls 31 ride over the teeth 28.

When the shaft 10 is again speeded up and arrives at the point when its speed synchronizes with that of the shaft 12, it has a momentary tendency to pass the latter, but the subsidiary uni-directional drive provided by the teeth 28 and pawls 31 acting between the driving shaft 10 and the controlling member 23 causes the latter and hence (by reason of the coupling pins 33) the intermediate member 22 to momentarily partly overrun the shaft 12 whereupon the intermediate member is compelled to travel to the right along the thread 17 and re-engage the teeth 25 and 29 and the drive is again positively established between the shaft 10 and the shaft 12.

For locking the mechanism for a solid drive, the dog clutch element 21 is slid to the left by a shoe 35 engaging a peripheral groove 36 around the clutch, said shoe being mounted on an arm 37 keyed on a spindle 38 which can be rocked from outside the casing 13 by a lever 39, this movement of the clutch element engaging its teeth 30 with the teeth 26 of the intermediate member (when said member is in its right hand position with the teeth 25 and 29 engaged) while not disengaging the teeth 20 from the keyways 19 of the shaft 12. The intermediate member 22 is then locked on the thread 17, and the teeth 25 and 29 cannot disengage so long as the teeth 26, 30 are maintained in engagement. It will be noticed that, with this construction, it is impossible to clash the teeth 26 and 30 when engaging them for a solid drive as these teeth must be revolving at the same speed.

With reference to the subsidiary uni-directional drive mechanism, it may be desirable in some cases to so arrange this mechanism that contact between the pawls 31 and the teeth 28 is reduced or avoided while the shaft 12 is overrunning the driving shaft 10 thereby reducing noise and wear between the pawls and teeth. This result is attained by means of the ball or roller bearing 40, the outer race 41 of which is mounted on the enlargement 11 and the inner race 42 on a floating flanged bush 43 provided with tongues 44 which abut against the pawls 31 as shown in Fig. 2. This arrangement utilizes the inertia of the floating inner race 42 and flanged bush 43 and the slight drag between the races 41 and 42. The pawls 31 themselves restrain the floating bush 43 from revolving with the race 41, and, in so doing, are prevented from engaging with the teeth 28, and are kept out of action until overrunning ceases and consequently the drag between the two races 41 and 42 also ceases, due to both the races then tending to revolve at the same speed. The pawls 31 are then free to engage with the teeth 28 under the action of their springs 32 when the dragging action momentarily tends to be reversed in direction as the driver is on the point of taking up the load automatically.

Other constructions to those above described involving the same principle are manifestly possible, and it will be understood that the driving and driven members are interchangeable, that is, the shaft 12 provided with the thread 17 may become the driving member and the shaft 10 may become the driven member. The positions of the pawls 31 and teeth 28 may also be interchanged.

What I claim and desire to secure by Letters Patent is:—

1. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, and means for coupling said controlling member and said intermediate member together.

2. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary uni-directional drive being positioned so that the teeth of the driving and intermediate members are located in definite rotational positions when the speed of the rotary driving member and the driven member synchronize, and means for coupling said controlling member and said intermediate member together.

3. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and means for coupling said controlling member and said intermediate member together, said coupling means permitting the slight rotation necessary to take up working clearances between the teeth of the intermediate and driving members.

4. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and means for coupling said controlling member and said intermediate member together, said coupling means permitting the slight rotation necessary to take up working clearances between the teeth of the intermediate and driving members and comprising tapered projections.

5. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and means for coupling said controlling member and said intermediate member together, said coupling means permitting the slight rotation necessary to take up working clearances between the teeth of the intermediate and driving members and comprising tapered projections, and means for locking said intermediate member to said driving member to obtain a solid drive.

6. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and means for coupling said controlling member and said intermediate member together, said coupling means permitting the slight rotation necessary to take up working clearances between the teeth of the intermediate and driving members and comprising tapered projections, and means for locking said intermediate member to said driving member to obtain a solid drive, said locking means comprising a second ring of teeth around said intermediate member, a clutch element keyed to said driven member, means for axially sliding said clutch element, and teeth on said clutch element co-operating with said second ring of teeth on the intermediate member when its teeth and those of the driving member are in engagement.

7. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and comprising pawls on the controlling member co-operating with a second ring of teeth around the driving member, and means for coupling said controlling member and said intermediate member together, said coupling means permitting the slight rotation necessary to take up working clearances between the teeth of the intermediate and driving members and comprising tapered projections, and means for locking said intermediate member to said driving member to obtain a solid drive, said locking means comprising a second ring of teeth around said intermediate member, a clutch element keyed to said driven member, means for axially sliding said clutch element, and teeth on said clutch element co-operating with said second ring of teeth on the intermediate member when its teeth and those of the driving member are in engagement.

8. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and comprising pawls on the controlling member co-operating with a second ring of teeth around the driving member, and means for coupling said controlling member and said intermediate member together, said coupling means permitting the slight rotation necessary to take up working clearances between the teeth of the intermediate and driving members and comprising tapered projections, means for locking said intermediate member to said driving member to obtain a solid drive, said locking means comprising a second ring of teeth around said intermediate member, a clutch element keyed to said driven member, means for axially sliding said clutch element, and teeth on said clutch element co-operating with said second ring of teeth on the intermediate member when its teeth and those of the driving member are in engagement, and means for eliminating contact between said pawls and said teeth.

9. An overrunning and synchronizing device comprising a rotary driving member, teeth therearound, a rotary driven member, a helical thread thereon, an axially-travelling internally-threaded intermediate member on said thread, teeth around said intermediate member co-operating with said driving teeth, a controlling member on said driven member adjacent to said thread, a subsidiary unidirectional drive between said driving member and said controlling member, said subsidiary unidirectional drive being positioned so that the teeth of the driving and intermediate members are located in definite rotational positions when the speed of the rotary driving member and the driven member synchronize, and comprising pawls on the controlling member co-operating with a second ring of teeth around the driving member, and means for coupling said controlling member and said intermediate member together, said coupling means permitting the slight rotation necessary to take up working clearances between the teeth of the intermediate and driving members and comprising tapered projections, means for locking said intermediate member to said driving member to obtain a solid drive, said locking means comprising a second ring of teeth around said intermediate member, a clutch element keyed to said driven member, means for axially sliding said clutch element, and teeth on said clutch element co-operating with said second ring of teeth on the intermediate member when its teeth and those of the driving member are in engagement, and means for eliminating contact between said pawls and said teeth, said eliminating means comprising an anti-friction bearing one race of which is on the driving member and the other on a flanged floating member, and tongues on said floating member controlling said pawls by reason of the inertia of the floating race and flanged member and the slight drag between the races.

In testimony whereof, I affix my signature.

NORTON LEGGE.